(12) United States Patent
Chee (10) Patent No.: US 11,184,742 B2
(45) Date of Patent: Nov. 23, 2021

(54) METHOD AND APPARATUS FOR DETERMINING AN APPROVER FOR REQUESTING PERMISSION TO JOIN A DYNAMICALLY-CREATED TALKGROUP

(71) Applicant: MOTOROLA SOLUTIONS, INC., Chicago, IL (US)

(72) Inventor: Chong Hin Chee, Gelugor (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 17 days.

(21) Appl. No.: 16/852,620

(22) Filed: Apr. 20, 2020

(65) Prior Publication Data

US 2021/0329420 A1 Oct. 21, 2021

(51) Int. Cl.
| H04W 4/08 | (2009.01) |
| H04W 4/12 | (2009.01) |
| H04L 29/06 | (2006.01) |
| H04W 4/10 | (2009.01) |

(52) U.S. Cl.
CPC ........... *H04W 4/08* (2013.01); *H04L 65/1093* (2013.01); *H04L 65/4061* (2013.01); *H04W 4/10* (2013.01); *H04W 4/12* (2013.01)

(58) Field of Classification Search
CPC ........... H04W 4/08; H04W 4/10; H04W 4/12; H04W 76/45; H04L 65/1093; H04L 65/4061
See application file for complete search history.

(56) References Cited

U.S. PATENT DOCUMENTS

| 5,081,669 | A | * | 1/1992 | Slaninka | H04W 84/08 455/149 |
| 5,493,696 | A | * | 2/1996 | Wolf | H04W 4/02 455/518 |
| 5,613,209 | A | | 3/1997 | Peterson et al. | |
| 6,204,844 | B1 | * | 3/2001 | Fumarolo | H04W 4/029 715/736 |
| 6,832,202 | B1 | | 12/2004 | Schuyler et al. | |
| 8,171,035 | B2 | | 5/2012 | Song et al. | |
| 8,195,215 | B2 | | 6/2012 | Marocchi et al. | |
| 8,274,897 | B1 | | 9/2012 | Pons et al. | |
| 8,620,764 | B2 | | 12/2013 | Moritz et al. | |
| 8,799,789 | B2 | | 8/2014 | Velusamy | |
| 8,805,431 | B2 | | 8/2014 | Vasavada et al. | |

(Continued)

OTHER PUBLICATIONS

Slack—Help Center13 downloaded from the internet: Apr. 13, 2020, https://get.slack.help/hc/en-US/articles/201864558-Set-your-Slack-status-and-availability, all pages.

(Continued)

*Primary Examiner* — Jenee Holland (57) ABSTRACT

A method and apparatus for determining an individual's identity who has authority to add a user to a talkgroup (approver) is provided herein. During operation, a context of a user requesting access to a talkgroup is determined. Past contexts for individuals who have requested access to past talkgroups are determined along with past approvers who approved adding the individual to the talkgroup. The current context is used to find similar past contexts and the past approver for the similar past context. The past approver is then used to authorize the current request for approving joining of the talkgroup.

12 Claims, 5 Drawing Sheets

(56) References Cited

U.S. PATENT DOCUMENTS

| | | | |
|---|---|---|---|
| 9,021,561 B2* | 4/2015 | Agulnik | H04W 76/11 |
| | | | 726/5 |
| 9,510,166 B1* | 11/2016 | Allen | H04W 76/45 |
| 9,591,133 B2 | 3/2017 | Agulnik et al. | |
| 9,686,665 B2 | 6/2017 | Igumnov et al. | |
| 9,730,026 B2 | 8/2017 | Wawrowski et al. | |
| 9,967,724 B1* | 5/2018 | Gan | H04W 4/90 |
| 10,027,801 B1 | 7/2018 | Subramanyam et al. | |
| 10,421,437 B1* | 9/2019 | Koskan | B60R 25/31 |
| 2002/0128030 A1* | 9/2002 | Eiden | H04B 13/005 |
| | | | 455/519 |
| 2004/0224710 A1* | 11/2004 | Koskelainen | H04W 4/24 |
| | | | 455/518 |
| 2005/0192041 A1* | 9/2005 | Oxley | H04W 8/186 |
| | | | 455/519 |
| 2006/0211404 A1 | 9/2006 | Cromp et al. | |
| 2007/0087769 A1* | 4/2007 | Takahashi | H04W 4/08 |
| | | | 455/518 |
| 2007/0103294 A1 | 5/2007 | Bonecutter et al. | |
| 2007/0239885 A1* | 10/2007 | Vadlakonda | H04M 3/56 |
| | | | 709/232 |
| 2007/0281723 A1* | 12/2007 | Chotai | H04L 65/4061 |
| | | | 455/518 |
| 2007/0291722 A1* | 12/2007 | Lee | H04L 61/2007 |
| | | | 370/338 |
| 2008/0028323 A1 | 1/2008 | Rosen et al. | |
| 2008/0140569 A1 | 6/2008 | Handel | |
| 2008/0155689 A1* | 6/2008 | Denninghoff | H04L 63/1458 |
| | | | 726/22 |
| 2009/0054097 A1* | 2/2009 | Kim | H04L 12/189 |
| | | | 455/518 |
| 2010/0159976 A1* | 6/2010 | Marocchi | H04W 8/186 |
| | | | 455/519 |
| 2010/0311459 A1* | 12/2010 | Holland | H04W 8/186 |
| | | | 455/518 |
| 2011/0016401 A1* | 1/2011 | Dailey | H04M 3/5116 |
| | | | 715/736 |
| 2011/0294512 A1* | 12/2011 | Khan | H04M 3/42102 |
| | | | 455/445 |
| 2011/0314163 A1* | 12/2011 | Borins | H04W 4/08 |
| | | | 709/227 |
| 2012/0316941 A1* | 12/2012 | Moshfeghi | G06Q 30/02 |
| | | | 705/14.16 |
| 2013/0059622 A1* | 3/2013 | Agulnik | H04W 4/08 |
| | | | 455/518 |
| 2013/0065628 A1 | 3/2013 | Pfeffer | |
| 2013/0231120 A1* | 9/2013 | Koc | H04B 7/0456 |
| | | | 455/450 |
| 2014/0243034 A1 | 8/2014 | Gurney et al. | |
| 2014/0347973 A1* | 11/2014 | Yu | H04W 24/04 |
| | | | 370/216 |
| 2015/0079919 A1* | 3/2015 | Shahaf | H04M 3/568 |
| | | | 455/404.1 |
| 2015/0117340 A1* | 4/2015 | Kawakami | G06F 21/74 |
| | | | 370/329 |
| 2016/0205519 A1* | 7/2016 | Patel | H04L 41/5041 |
| | | | 455/518 |
| 2016/0227384 A1* | 8/2016 | Mazzarella | H04W 12/08 |
| 2016/0227588 A1* | 8/2016 | Patel | H04W 92/02 |
| 2016/0234660 A1* | 8/2016 | Tillet | H04W 4/10 |
| 2017/0034672 A1* | 2/2017 | Pai | H04W 4/08 |
| 2017/0078340 A1* | 3/2017 | Arora | H04M 3/56 |
| 2017/0289943 A1* | 10/2017 | Zhao | H04W 60/04 |
| 2017/0294131 A1* | 10/2017 | Jedrzejewski | H04W 4/029 |
| 2018/0253813 A1 | 9/2018 | Kaguma et al. | |
| 2018/0324895 A1* | 11/2018 | Baek | H04W 4/10 |
| 2018/0343547 A1* | 11/2018 | Chaki | H04L 67/1068 |
| 2018/0359808 A1* | 12/2018 | Lee | H04W 84/18 |
| 2019/0050238 A1* | 2/2019 | Lim | H04W 4/38 |
| 2019/0082304 A1* | 3/2019 | Bestor | H04M 3/493 |
| 2019/0149959 A1* | 5/2019 | Kee | H04M 3/562 |
| | | | 704/258 |
| 2019/0222698 A1* | 7/2019 | Musik | G06F 16/686 |
| 2019/0297361 A1* | 9/2019 | Hiraoka | H04N 21/2387 |
| 2019/0313480 A1* | 10/2019 | Lim | H04W 4/80 |
| 2020/0042945 A1 | 2/2020 | Schuler et al. | |
| 2020/0100069 A1* | 3/2020 | Yang | H04W 76/27 |

OTHER PUBLICATIONS

Anna Wu et al.: "Supporting collaborative sense-making in emergency management through geo-visualization", International Journal of Human-Computer Studies, vol. 71, No. 1, Jan. 1, 2013, pp. 4-23. XP055152781, ISSN: 1071-5819 (20 pages).

* cited by examiner

METHOD AND APPARATUS FOR DETERMINING AN APPROVER FOR REQUESTING PERMISSION TO JOIN A DYNAMICALLY-CREATED TALKGROUP

Push-to-talk (PTT) devices are commonly employed by public safety personnel, air traffic controllers, emergency workers, construction site workers and others who need to be in constant and readily available voice communication. PTT, also known as press-to-transmit, is a method of communicating using half-duplex communication lines. A PTT button may be pressed to switch a device from a voice reception mode to a transmit-mode. For example, one operator may depress the PTT button on her device and speak into the device's microphone. The speech is converted into an appropriate format and transmitted to one or more other devices, where the operators of those other devices hear the first operator speak through their device's speaker.

In a two-way radio system, each PTT radio typically communicates with one group of radios (talkgroup) at a time. Even though a radio may switch between talkgroups, the radio may still only be able to communicate with a single talkgroup at a time. For example, a firefighter may be affiliated with or using a firefighter talkgroup and a police officer may be affiliated with or using a police talkgroup. Talkgroups outside of those currently listened to by a radio will not be heard by other radios or consoles. Thus, a radio speaker will only output audio from a talkgroup associated with the radio, and the radio's transmission will only be heard by those communicating on a same talkgroup.

Instead of assigning, for example, a radio channel to one particular organization (group) at a time, users are instead assigned to a logical grouping, a "talkgroup". When any user in that group wishes to converse with another user in the talkgroup, a vacant radio channel is found automatically by the system and the conversation takes place on that channel. Many unrelated conversations can occur on a channel, making use of the otherwise idle time between conversations. A control channel coordinates all the activity of the radios in the system. The control channel sends packets of data to enable one talkgroup to talk together, regardless of frequency.

Oftentimes talkgroups are dynamically created to bring together necessary individuals during a public-safety event. For example, during a building fire, it may be beneficial to add a building maintenance manager to a talkgroup comprising firefighters actively fighting the building fire. However, because of the critical nature of the talkgroup, simply adding any individual who wishes to join the talkgroup to the talkgroup may prove problematic since unwanted users may attempt to join the talkgroup. Because of this, an approver is usually required to approve any individual being added to a talkgroup. However, it is oftentimes difficult to determine who the approver is during critical situations. For example, in a dynamically created talkgroup comprising police and fire personnel, does a police commander, or a fire commander give approval? Because of the difficulty in determining an approver, critical time can be wasted before a needed individual is added to the talkgroup. It would be beneficial if this time was reduced.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for determining an individual's identity who has authority to add a user to a talkgroup (approver) is provided herein. During operation, a context of a user requesting access to a talkgroup is determined. Past contexts for other individuals who have requested access to past talkgroups are determined along with past approvers who approved adding the individual to the talkgroup. The current context is used to find similar past contexts and the past approver for the similar past context. The past approver is then used to authorize the current request for approving joining the talkgroup.

Expanding on the above, a context of a current user wishing to join a talkgroup will be determined. A database of past contexts for other users who requested to join a talkgroup in the past will be accessed to determine similar contexts (i.e., similar to the current context of the current user). An identity of the approver for the past similar contexts is determined from the database. More particularly, the approver will be the same individual who approved past users to join a talkgroup (most likely a different talkgroup) when the past users were experiencing a similar context as the current user.

Expanding on the above, in one embodiment of the present invention the user's context is based on a status of sensors worn by the user. In another embodiment of the present invention, the user's context is based on a computer-aided dispatch incident identification (CAD ID) assigned to the user. In yet another embodiment of the present invention, the user's context is based both on the status of the sensors worn by the user and the CAD ID assigned to the user.

As one of ordinary skill in the art will recognize, a CAD ID is utilized to determine a current task assigned to an officer. The incident identification (sometimes referred to as an incident scene identifier, or a CAD incident identifier) is generated for incidents where an officer is dispatched. This ID could be something as simple as a number identifying a particular incident, or something as complicated as an identification that is a function of populated fields, one of which may comprise an incident type.

Consider the following example of the above: Multiple first responders are assigned to assist in a robbery (by assigning them a particular CAD ID). During the incident, a car chase may ensue that crosses jurisdictional boundaries. Eventually, many officers from multiple jurisdictions wind up chasing the suspect. It would be beneficial if quick approval could be made for those individuals joining the pursuit to join a dynamically-created talkgroup specifically created for this particular incident. The approver will be quickly determined as the individual who approved persons joining a past talkgroup for past similar CAD IDs.

Consider another example of the above: Currently multiple agencies are fighting a fire started by a suspected arsonist. Police and Firefighters are on scene. Each individual on scene is assigned to the CAD ID of the suspected arson, as well as several individuals attempting to apprehend the suspect (off scene). A dynamically-created talkgroup has been established for those individuals on scene. The talkgroup comprises those individuals assigned to the arson and who are on scene (a geographic location of the arson). Officer Smith is assigned to the incident and arrives on scene and wishes to join the dynamically-created talkgroup. Since officer Smith is identified as being at the location of the arson, and is assigned to the arson incident, a database is accessed with the location and incident ID, and an approver is determined who granted access for a similar location (e.g., neighborhood, city, . . . , etc.) and similar CAD ID. Permission to join the talkgroup is then requested by Officer Smith from the approver.

Figure 1:
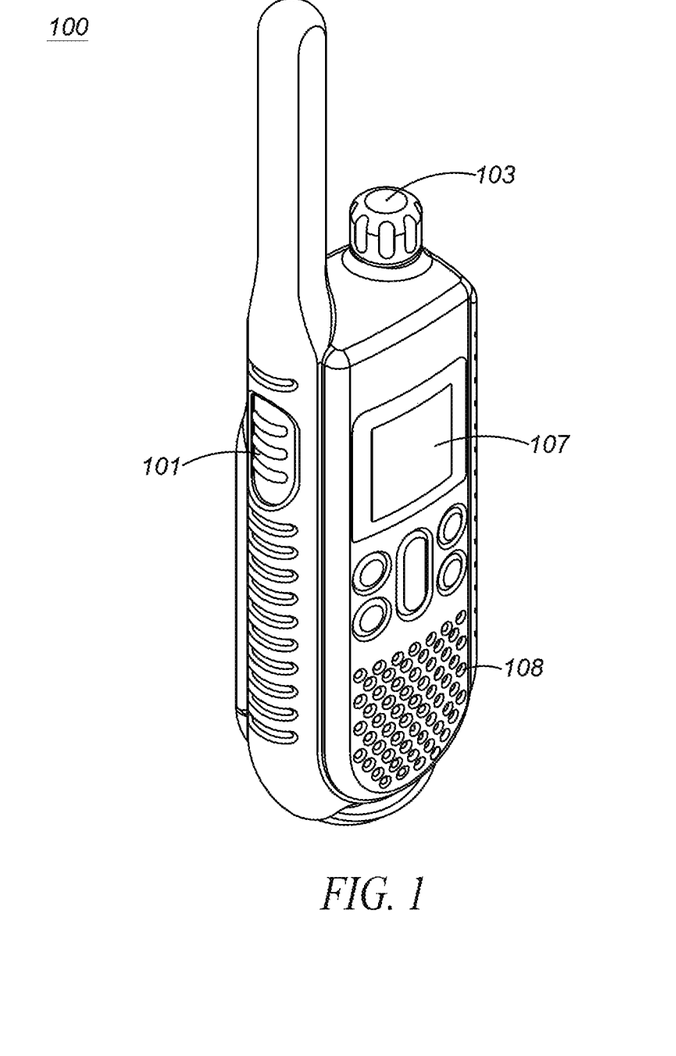
FIG. 1 illustrates push-to-talk (PTT) radio.

FIG. 1 illustrates push-to-talk (PTT) radio 100. As shown, radio 100 comprises PTT button 101, knob 103, display/screen 107, and speaker/microphone 108. PTT button 101 comprises a standard button, that when pressed, transitions radio 100 from a listening state, to a transmit state, transmitting over a specific talkgroup. Display 107 comprises a way of conveying (e.g., displaying) PTT information to the user. In particular, in an embodiment, a talkgroup may be displayed to the user as an alpha-numeric output on display 107. Display 107 may simply comprise a liquid-crystal display (LCD), or may comprise additional types of displays (e.g., a light-emitting diode (LED) display). Display 107 may also comprise a touch-screen display that provides both an output interface and an input interface between the device and a user. Display 107 may also provide graphics, video, and any combination thereof.

Speaker/microphone combination 108 comprises a standard speaker for outputting audio and a standard microphone for receiving audio (voice). More particularly, speaker 108 converts an electrical signal generated from an active application to human-audible sound waves and microphone 108 converts sound waves to electrical signals for transmission.

Knob 103 serves as a way to control the volume of speaker 108, and also serves as a means for switching between talkgroups and selecting a talkgroup that the user wishes to join. Knob 103 is approximately a cylindrical object. Knob 103 can alternatively be implemented as a variety of different objects, including conical shapes, spherical shapes, dials, cubical shapes, rods, etc., and may have a variety of different textures on their surfaces, including bumps, lines, or other grips, or projections or members extending from the circumferential surface.

The user 201 (shown in FIG. 2) preferably grips or contacts the circumferential surface of knob 103 and rotates it a desired amount to scroll through menu items, for example, talkgroups that may be selected. Once knob 103 is rotated to highlight a particular talkgroup, any activation (pushing) of the PTT button 101 will cause radio 100 to communicate over the highlighted talkgroup or alternatively transmit a request to join the talkgroup. Thus, if a user does not have authority to transmit on a particular talkgroup, then authorization/approval is needed. For example, a dynamically-created talkgroup "Robbery in Progress" appeared on device 100 in FIG. 2. User 201 may not have permission to use that talkgroup. By attempting to communicate over the talkgroup, a request for permission is sent to an approver.

Figure 2:
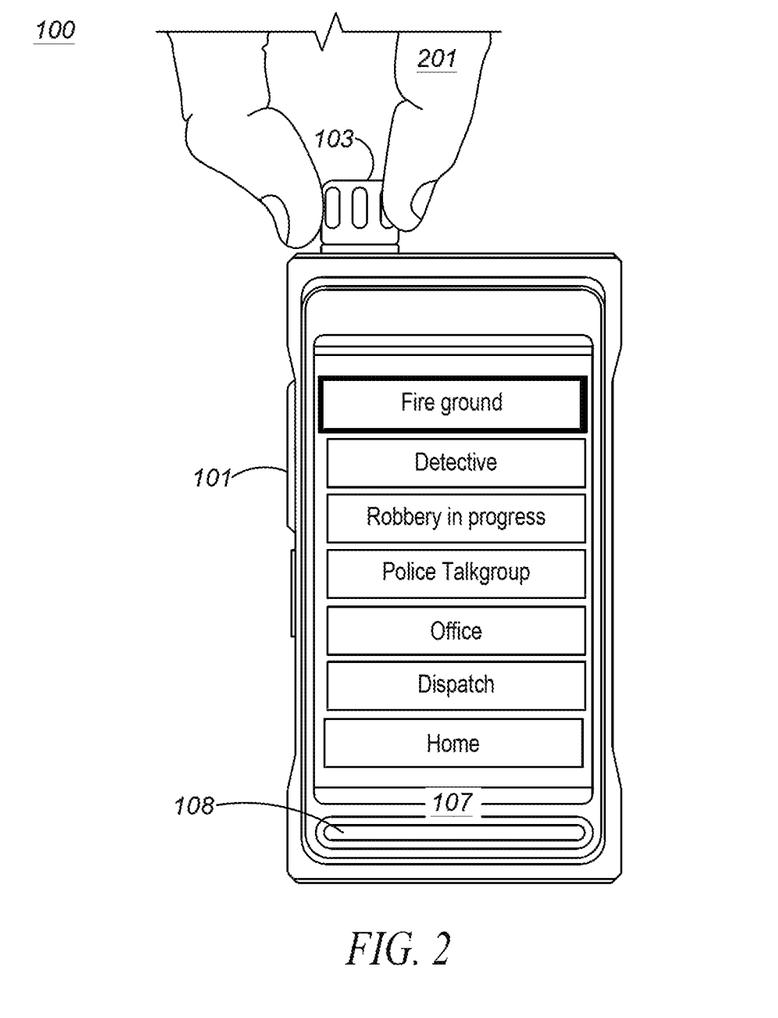
FIG. 2 illustrates push-to-talk (PTT) radio.

It should be noted that display 107 may display the names of the talkgroups, which include the names of "dynamically created" talkgroups that are created when a particular group of individuals wish to communicate with each other. For example, as shown in FIG. 2, the Police Talkgroup and the Fire ground talkgroup may be displayed, so when highlighted, communications to other police officers, or firemen take place upon the pushing of the PTT button 101. However, as shown, a dynamically-created "Robbery in Progress" talkgroup is also displayed, with, activation of the PTT button causing communications to take place among all individuals that were assigned this talkgroup, or if a user is not authorized, causes a request to be sent to an approver.

It should be noted that when approval is given, server 414 may add the user to the dynamically-created talkgroup by sending a request to a core network to perform a "dynamic regrouping". As known in the art, with the dynamic regrouping feature, the server can seamlessly cause users to be added to a group without any intervention from radio operators.

As discussed, modern two-way radio systems comprise talkgroups, where it is possible for a radio to be a member of any combination of talkgroups. As a member of a talkgroup, a radio may receive transmissions from, as well as transmit to all members of the talkgroup. Transmission and reception of information to radios outside of an assigned talkgroup is generally not performed. Therefore, once assigned to a particular talkgroup, the radio may communicate with all first responders that were assigned to the particular talkgroup. Thus, server 414 is operable to create or add users to specific talkgroups with members that comprise those individuals that are assigned to a particular incident or those officers whose body-worn sensors indicate the officer is experiencing a particular context.

Figure 3:
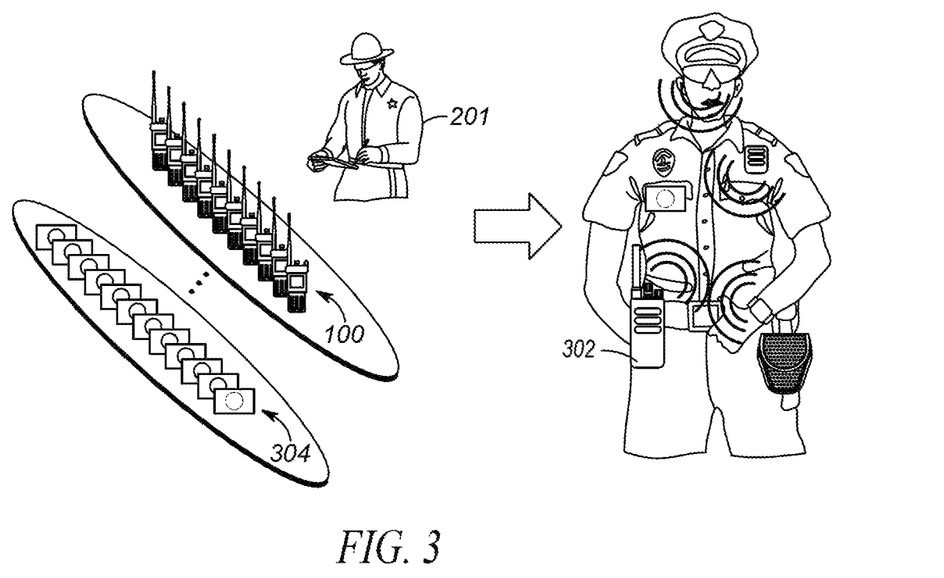
FIG. 3 illustrates an operational environment for the present invention.

FIG. 3 illustrates an operational environment where an officer is equipped with body-worn sensors that determine an officer's context. As shown, a public safety officer 301 will be equipped with devices 100, 304 that determine various physical and environmental conditions surrounding the public-safety officer (i.e., the officer's context). The officer's context is generally reported back to a dispatch operator so an appropriate action may be taken. For example, future police officers may have a sensor that determines when a gun is drawn (not shown in FIG. 3). Upon detecting that an officer has drawn their gun, a notification may be sent back to the dispatch operator and server 414 so that, for example, other officers in the area may be notified of the situation. As mentioned above, the officer's context (as determined by the devices, e.g., devices 100 and 304) is used to access a database of contexts and who granted authority to join a talkgroup during that particular context. The database may be created manually (by for example a dispatch operator, supervisor, city planning, or any other individual or group), or dynamically created by server 414. During creation, whenever an individual authorizes or denies a user to join a dynamically-created talkgroup, the context of the user is determined. The context and the identity of the individual are added to database 464. Table 1 illustrates entries into database 464.

TABLE 1

Officer context and Approver

| Context | Approver |
|---|---|
| Police officer assigned to Arson | Officer Jones |
| Police officer at location of Robbery | Officer Smith |
| Building maintenance at location of building fire | Officer Jones |
| . . . | . . . |
| Police officer involved in foot chase | Officer Andersen |

When more than one context is matched, and several approvers are identified as potential approvers, then one of the persons will need to be identified to approve a user to be added to a talkgroup. For example, a police officer may be assigned to an arson (Officer Jones having authority to approve adding to arson talkgroups) and also be involved in a foot chase (Officer Andersen having authority to approve foot chase talkgroups). Officer Andersen or Officer Jones will need to be picked as the approver. In order to accomplish this task, various rules may be used. For example, the approver may be chosen randomly from all officer's having authority to approve, an approver having a highest, or lowest rank may be chosen, . . . , or any other predetermined rule may be used to choose the approver if multiple persons are identified.

In order to determine a user's context, is envisioned that the public-safety officer will have an array of shelved devices available to the officer at the beginning of a shift. The officer will select the devices off the shelf, and form a personal area network (PAN) with the devices that will accompany the officer on his shift. For example, the officer may pull a gun-draw sensor, a body-worn camera, a wireless microphone, a smart watch, a police radio, smart handcuffs, a man-down sensor, . . . , etc. All devices pulled by the officer will be configured to form a PAN by associating (pairing) with each other and communicating wirelessly among the devices. One or several devices may be configured with a digital assistant (virtual partner).

A method called bonding is typically used for recognizing specific devices and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device.

As shown in FIG. 3, public-safety officer 301 has an array of devices to use during the officer's shift. For example, the officer may pull one radio 100 and one camera 304 for use during their shift. Other devices not shown in FIG. 3 may be pulled as well. As shown in FIG. 1, officer 301 will preferably wear the devices during a shift by attaching the devices to clothing. These devices will form a PAN throughout the officer's shift.

Figure 4:
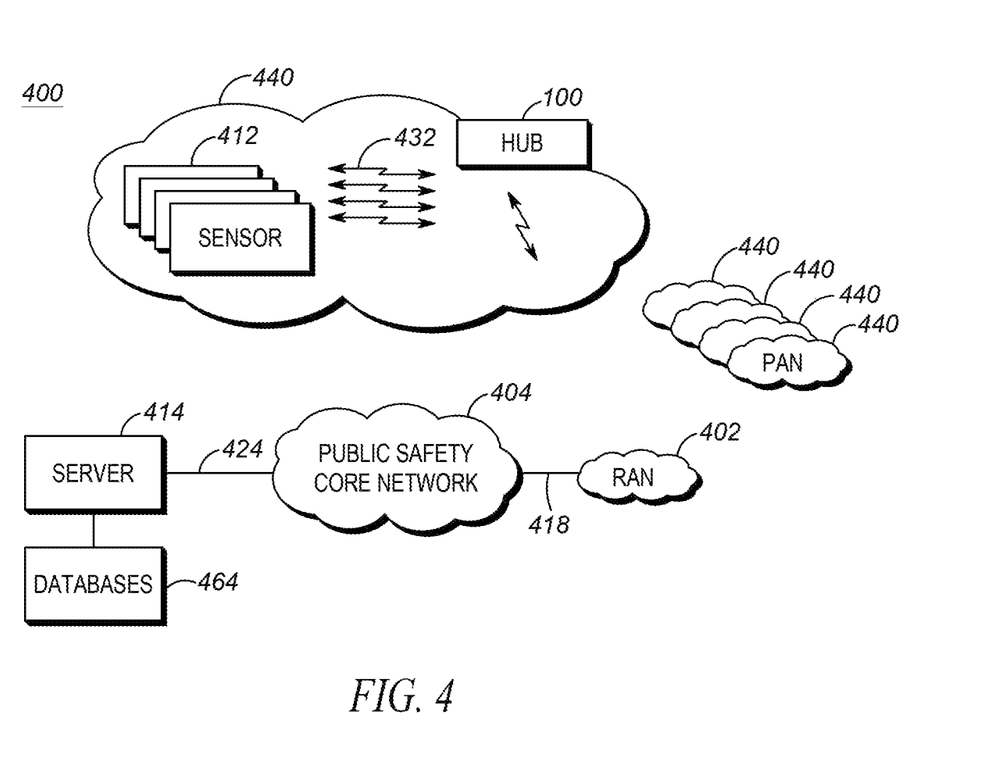
FIG. 4 depicts an example communication system that incorporates a personal-area network.

FIG. 4 is a general operating environment for the present invention. Environment 400 includes one or more radio access networks (RANs) 402 (only one shown in FIG. 4), a public-safety core network 404, a server 414 within a dispatch center, and communication links 418 and 424. Server 414 is configured to receive a context of an officer attempting to access a dynamically-created channel, and determine an approver to authorize the officer's access to the dynamically-created channel. The approver may be notified of the desire to access the channel by server 414, and have the opportunity to approve or disapprove the access.

Communication between server 414 and radio 100 (acting as a hub) takes place through an intervening network such as, but not limited public-safety core network 404 and RAN 402.

Each RAN 402 includes typical RAN elements such as base stations, base station controllers (BSCs), routers, switches, and the like, arranged, connected, and programmed to provide wireless service to user equipment (e.g., device 100) operated by an officer not shown in FIG. 4) in a manner known to those of skill in the relevant art. RANs may operate according to an industry standard land mobile radio (LMR) or cellular protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ETSI, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented.

Radio/hub 100 may be any suitable computing and/or communication devices operable to engage in wireless communication over an air interface as is known to those in the relevant art. Radio 100 comprises any device capable of communication over a talkgroup. Mobile radio 100 may implement a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long-range transmitter may implement a Long Term Evolution (LTE) (including LTE-Advanced or LTE-Advanced Pro compliant with, for example, the 3GPP TS 36 specification series) or 5G (including a new radio (NR) air interface compliant with the 3GPP TS 38 specification series) protocol, among other possibilities, over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), an LTE Direct or LTE Device to Device, or a PTT over IP (PoIP) application may be implemented. Direct mode LTE standards may additionally or alternatively be implemented as well, including but not limited to the LTE Direct device-to-device standard.

It should be noted that while only a single radio 100 is shown in FIG. 4, one of ordinary skill in the art will recognize that hundreds of officers and radios 100 may actually exist in environment 400.

During operation, an officer is equipped with PAN 440 comprising sensors 412 and radio 100. Radio 100 is periodically providing a status of sensors 412 to server 414. For example, sensors 412 may comprise a gun-draw sensor, a body temperature sensor, an accelerometer, a heart-rate sensor, a breathing-rate sensor, a camera, a GPS receiver capable of determining a location of the user device, smart handcuffs, a clock, calendar, environmental sensors (e.g. a thermometer capable of determining an ambient temperature, humidity, presence of dispersed chemicals, radiation detector, etc.), an accelerometer, a biometric sensor (e.g., wristband), a barometer, speech recognition circuitry, a gunshot detector, . . . , etc. Some examples follow:

A sensor-enabled holster 412 may be provided that maintains and/or provides state information regarding a weapon or other item normally disposed within the user's sensor-enabled holster 412. The sensor-enabled holster 412 may detect a change in state (presence to absence) and/or an action (removal) relative to the weapon normally disposed within the sensor-enabled holster 412. The detected change in state and/or action may be reported to the portable radio 100 via its short-range transceiver. In some embodiments, the sensor-enabled holster may also detect whether the first responder's hand is resting on the weapon even if it has not yet been removed from the holster and provide such information to portable radio 100. Other possibilities exist as well.

A biometric sensor 412 (e.g., a biometric wristband) may be provided for tracking an activity of the user or a health status of the user 201, and may include one or more movement sensors (such as an accelerometer, magnetometer, and/or gyroscope) that may periodically or intermittently provide to the portable radio 100 indications of orientation, direction, steps, acceleration, and/or speed, and indications of health such as one or more of a captured heart rate, a captured breathing rate, and a captured body temperature of the user 201, perhaps accompanying other information.

An accelerometer 412 may be provided to measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

A heart rate sensor 412 may be provided and use electrical contacts with the skin to monitor an electrocardiography (EKG) signal of its wearer, or may use infrared light and imaging device to optically detect a pulse rate of its wearer, among other possibilities.

A breathing rate sensor 412 may be provided to monitor breathing rate. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor 412 may be provided, and includes an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

As mentioned, server 414 comprises, or is part of a computer-aided-dispatch center, manned by an operator providing necessary dispatch operations. For example, server 414 typically comprises a graphical user interface that provides the dispatch operator necessary information about public-safety officers. As discussed above, much of this information originates from sensors 412 providing information to hub 100, which forwards the information to RAN 202 and ultimately to server 414. Server 414 is configured to receive sensor data from sensors 412 and keep track of a user's context. For example, for each user of the system, server 414 may track the user's current sensor data to determine a context for the user. Any voice transmissions may be analyzed as well to determine a context. This information may be used to compile a database 464 of a user's context.

Figure 5:
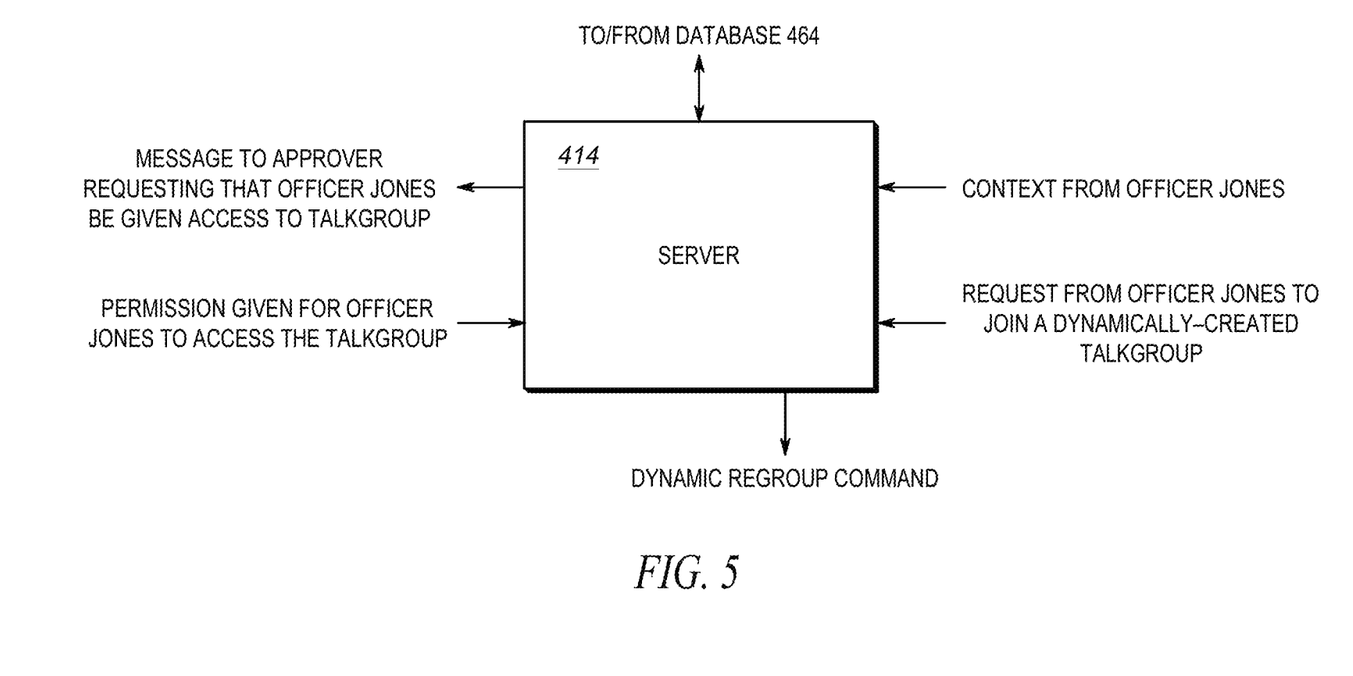
FIG. 5 is a block diagram of the server of FIG. 4.

FIG. 5 is a block diagram of server 414. Server 414 comprises a digital signal processor (DSP), general purpose microprocessor, a programmable logic device, or application specific integrated circuit (ASIC) and is operable to determine an approver as described above and notify the approver that approval is needed for a user to access a dynamically-created talkgroup.

In an embodiment, server 414 is embodied within a dispatch center, however in alternate embodiments the device may be embodied within the public-safety core network 404, or more computing devices in a cloud compute cluster (not shown), or some other communication device not illustrated in FIG. 5, and/or may be a distributed communication device across two or more entities.

As shown in FIG. 5, during operation, server 414 is configured to continuously receive contexts from officers. Although only the context from Officer Jones is shown in FIG. 5, contexts from many hundreds of officers are received by server 414. As shown, server 414 is also configured to receive a request from Officer Jones to join a dynamically-created talkgroup. In response to this request, server 414 is configured to access database 464 to determine the identity of the person authorized to approve Officer Jones's joining the dynamically-created talkgroup.

More particularly, the context of Officer Jones is mapped to an authorizer. The mapping process preferably comprises an operation that associates each element of a given set (the domain) with one or more elements of a second set (the range). The context comprises the domain, while the authorizer comprises the range. The mapping is determined by accessing table 1 within database 264.

Server 414 will then map the context to an authorizer. More specifically, if a context x is an element of a group of possible contexts X (i.e., x∈X), we say that f "takes the value" or "maps to" f(x) at x. The set X is called the domain of the function f. The set of possible outcomes of f(x) is called the range. The mapping may be explicit based on predefined rules (as shown in Table 1), or the mapping may be trained via neural network modeling. The mapping process preferably comprises an operation that associates each element of a given set (the domain) with one or more elements of a second set (the range). The officer's context comprises the domain, while the authorizer the range. For example, y=F(x), where y is the range and x is the domain. If y is the officer's context and authorizer comprises the domain, then:

Authorizer=Function(current context).

When radio 100 transmits over any talkgroup, a particular identification (ID) of the radio is provided with the communication. The ID uniquely identifies the radio. The identification of the radio can be associated with its operator (e.g., Officer Bob currently operates radio 010020). This identification may be simply sub-audible data included with the transmission, or may comprise information received on a separate data channel. Therefore, when Server 414 receives a communication from a particular radio, it can also receive an ID of any radio sending the transmission and determine the user of the radio.

The ID can be used to determine if an individual has access to the particular talkgroup. In other words, in one embodiment of the present invention, server 414 will check a user's ID to make sure they have permission to access a particular talkgroup. Thus, when a user (i.e., a user operating radio 100) needs to transmit on a dynamically-created talkgroup, there can exist a situation in which the user does not have, in advance, authorization to do so.

As discussed, a mechanism for a user to gain access to the talkgroup is provided by determining an individual authorized to OK the user's joining the talkgroup, and then joining the user to the talkgroup after approval is given. It should be noted that the authorizer will have the choice to allow access to the dynamically-created talkgroup or not.

It should be noted that server 414 may add the authorized user to the talkgroup by sending a request to core network 404 to perform a "dynamic regrouping". As known in the art, with the dynamic regrouping feature, server 414 can seamlessly cause users to be added to a talkgroup without any intervention from radio operators.

Consider the example where Officer Jack wishes to join a dynamically-created talkgroup. However, Officer Jack does not have authorization to transmit on the talkgroup. In response to receiving the request from Officer Jack, server 301 will determine an authorizer and add the authorizer (e.g., Commander Dudi) to a private talkgroup with Officer Jack. Server 414 can update officer Dudi on the situation, or alternatively Officer Jack can provide the necessary information to Officer Dudi. For example, the server may message officer Dudi stating that, "Officer Jack requests being added to Arson talkgroup. Commander Dudi, do you authorize?" Commander Dudi then can give the appropriate action command (permission) to have Officer Jack added to the dynamically-created talkgroup. Alternatively, Commander Dudi can simply key the radio to approve the request. (It should be noted that in this case, it is assumed a side conversation between officer Jack and Commander Dudi can take place over another communication talkgroup.

FIG. 5 illustrates server 414. As shown, server 414 comprises a microprocessor, a digital signal processor (DSP), general purpose microprocessor, a programmable logic device, or application specific integrated circuit (ASIC) that serves as logic circuitry.

Server 414 is configured is configured to determine that a user wishes to be added to a dynamically-created talkgroup, determine a context for the user, wherein the context is taken from the group consisting of a current assignment for the user, and a current sensor state for the user, access a database with the context to determine similar pasts contexts for other users and determining the authorizer who approved joining a past talkgroup for the similar past contexts, message the authorizer to request that the user be added to the dynamically-created talkgroup, receive approval from the authorizer to add the user to the dynamically-created talkgroup, and cause the dynamically-created talkgroup to be regrouped based on the received approval to add the user to the dynamically-created talkgroup.

With the above in mind, server 414 comprises network interfaces 501 includes elements including processing, modulating, and transceiver elements that are operable in accordance with any one or more standard or proprietary wireless interfaces. Examples of network interfaces (wired or wireless) include Ethernet, T1, USB interfaces, IEEE 802.11b, IEEE 802.11g, any over-the-air transmission protocol, . . . , etc. Although multiple interfaces 501 are shown in FIG. 5, more or less interfaces may be included in server 414.

Through these interfaces, server 414 is shown receiving a context from an officer (in this example, Officer Jones) and receiving a request from officer Jones to join a dynamically-created talkgroup. Server 414 is shown coupled to database 464 where database 464 is accessed to determine similar contexts as officer Jones, and to determine an approver from the database as described above. A message is sent to the approver requesting that officer jones be given access to the dynamically-created talkgroup, and permission is shown in FIG. 5 being received by the approver.

As discussed above, the current assignment for the user may be determined from a computer-aided dispatch (CAD) identification, and the current sensor state of a user may comprise at least one sensor from a Personal-Area Network (PAN) worn by the user. In one embodiment, one sensor comprises a location sensor.

It should be noted in FIG. 5 that the message to the approver, and permission from the approver may be sent and received over a talkgroup specifically created for this task.

Figure 6:
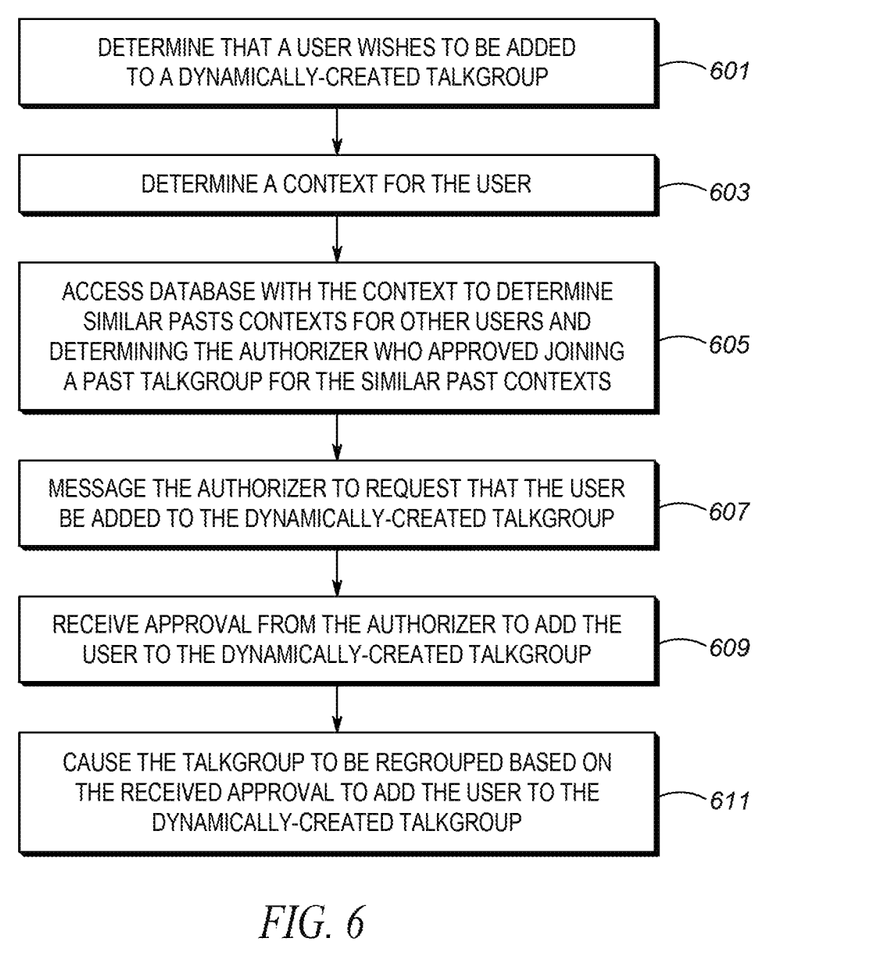
FIG. 6 is a flow chart showing operation of the server of FIG. 5.

The logic flow illustrated in FIG. 6 shows those steps (not all necessary) for server 414 to authorize a user to transmit on a dynamically-created talkgroup. The logic flow begins at step 601 where server 414 determines that a user wishes to be added to a dynamically-created talkgroup. As discussed, this determination is preferably from a message received from the user, transmitted to server 414 over RAN 402.

At step 603, server 414 determines a context for the user. As discussed, the context is taken from the group consisting of a current assignment for the user, and a current sensor state for the user. These are preferably received by server 414 from device 100 over RAN 402.

At step 605, server 414 accesses database 464 with the context to determine similar pasts contexts for other users and determining the authorizer who approved joining a past talkgroup for the similar past contexts.

The logic flow continues to step 607 where server 414 messages the authorizer to request that the user be added to the dynamically-created talkgroup. As discussed, this messaging may take place over RAN 402 on a specifically-created talkgroup used for that purpose.

At step 609 an approval is received from the authorizer to add the user to the dynamically-created talkgroup. In a similar manner, the approval may be received over the same talkgroup used to send the request in step 607.

Finally, server 414 causes the talkgroup to be regrouped based on the received approval to add the user to the dynamically-created talkgroup (step 611). This is preferably accomplished via server 414 messaging core network 404 to have core network 404 regroup the talkgroup.

It should be noted that if server 414 does not receive approval from the approver, no regrouping will take place, and the user will not be added to the dynamically-created talkgroup.

As discussed above, the current assignment for the user may be determined from a computer-aided dispatch (CAD) identification, and the current sensor state of a user may comprise at least one sensor 412 from a Personal-Area Network (PAN) worn by the user. The sensor 412 may comprise a location sensor, such as a GPS receiver.

In the foregoing specification, specific embodiments have been described. However, one of ordinary skill in the art appreciates that various modifications and changes can be made without departing from the scope of the invention as set forth in the claims below. For example, instead of requiring permission from an approver prior to joining a dynamically-created talkgroup, in an alternate embodiment, a user is allowed to join a talkgroup, and request permission to stay on that talkgroup. The steps are similar to the above-described technique, except that approval takes place after joining. If approval is not given, the talkgroup may be dynamically regrouped to remove the user. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for determining an authorizer who has authority to add a user to a dynamically-created talkgroup, the method comprising the steps of:

determining that the user wishes to be added to a dynamically-created talkgroup;

determining a context for the user, wherein the context is taken from the group consisting of a current assignment for the user, and a current sensor state for the user;

accessing a database with the context to determine similar past contexts for other users and determining the authorizer who approved joining a past talkgroup for the similar past contexts;

messaging the authorizer to request that the user be added to the dynamically-created talkgroup;

receiving approval from the authorizer to add the user to the dynamically-created talkgroup; and regrouping the dynamically-created talkgroup based on the received approval to add the user to the dynamically-created talkgroup.

2. The method of claim 1 wherein the current assignment for the user is determined from a computer-aided dispatch (CAD) identification.

3. The method of claim 1 wherein the current sensor state of a user comprises at least one sensor from a Personal-Area Network (PAN) worn by the user.

4. The method of claim 3 wherein the one sensor comprises a location sensor.

5. The method of claim 1 wherein the step of messaging the authorizer comprises the step of messaging the authorizer over a talkgroup and the step of receiving the approval comprises the step of receiving the approval over the talkgroup.

6. An apparatus comprising:
logic circuitry configured to:
determine that a user wishes to be added to a dynamically-created talkgroup;
determine a context for the user, wherein the context is taken from the group consisting of a current assignment for the user, and a current sensor state for the user;
access a database with the context to determine similar past contexts for other users and determine an authorizer who approved joining a past talkgroup for the similar past contexts;
message the authorizer to request that the user be added to the dynamically-created talkgroup;
receive approval from the authorizer to add the user to the dynamically-created talkgroup; and
cause the dynamically-created talkgroup to be regrouped based on the received approval to add the user to the dynamically-created talkgroup.

7. The apparatus of claim 6 wherein the current assignment for the user is determined from a computer-aided dispatch (CAD) identification.

8. The apparatus of claim 6 wherein the current sensor state of a user comprises at least one sensor from a Personal-Area Network (PAN) worn by the user.

9. The apparatus of claim 8 wherein the one sensor comprises a location sensor.

10. The apparatus of claim 6 wherein the message to the authorizer is sent over a talkgroup and approval from the authorizer is received over the talkgroup.

11. An apparatus comprising:
logic circuitry configured to:
determine that the user wishes to be added to a dynamically-created talkgroup;
determine a context for the user, wherein the context is taken from the group consisting of a current assignment for the user, and a current sensor state for the user;
access a database with the context to determine similar past contexts for other users and determining the authorizer who approved joining a past talkgroup for the similar past contexts; and
message the authorizer to request that the user be added to the dynamically-created talkgroup;
receive approval from the authorizer to add the user to the dynamically-created talkgroup;
cause the dynamically-created talkgroup to be regrouped based on the received approval to add the user to the dynamically-created talkgroup;
wherein the current assignment for the user is determined from a computer-aided dispatch (CAD) identification;
wherein the current sensor state of a user comprises at least one sensor from a Personal-Area Network (PAN) worn by the user; and
wherein the one sensor comprises a location sensor.

12. The apparatus of claim 11, wherein the message to the authorizer is sent over a talkgroup and approval from the authorizer is received over the talkgroup.

* * * * *